United States Patent [19]

Oberste-Padtberg et al.

[11] Patent Number: 4,838,352
[45] Date of Patent: Jun. 13, 1989

[54] PROCESS FOR PLUGGING SUBTERRANEAN FORMATIONS

[75] Inventors: Rüdiger Oberste-Padtberg; Philippe Parcevaux; 3rd inventor Hervé Perthuis Sylvie Peulet, all of St-Etienne, France

[73] Assignee: Dowell Schlumberger Incorporated, Tulsa, Okla.

[21] Appl. No.: 122,958

[22] Filed: Nov. 19, 1987

[30] Foreign Application Priority Data

Nov. 25, 1986 [FR] France ................................. 86 16528
Jul. 27, 1987 [FR] France ................................. 87 10669

[51] Int. Cl.⁴ ........................ E21B 33/138; E21B 33/16
[52] U.S. Cl. .................................... 166/291; 166/295; 166/300
[58] Field of Search ........................ 166/291, 292–295, 166/270, 300; 405/263, 264; 523/130, 132

[56] References Cited

U.S. PATENT DOCUMENTS

| | | | |
|---|---|---|---|
| 3,435,899 | 4/1969 | McLaughlin et al. | 166/293 |
| 3,741,307 | 6/1973 | Sandiford et al. | 166/292 X |
| 3,805,893 | 4/1974 | Sarem | 166/270 |
| 3,884,302 | 5/1975 | Messenger | 166/291 |
| 4,004,639 | 1/1977 | Sandiford | 166/270 X |
| 4,590,228 | 5/1986 | Soreau et al. | 405/264 X |
| 4,669,543 | 6/1987 | Young | 166/295 X |
| 4,669,919 | 6/1987 | Hilterhaus et al. | 405/264 |

Primary Examiner—George A. Suchfield
Attorney, Agent, or Firm—Stephen A. Littlefield

[57] ABSTRACT

The invention concerns a new process for plugging and/or consolidating a permeable geological formation, notably when traversed by a borehole.

The process, according to this invention, comprises the following steps: (a) insertion into the formation of an overdelayed gelling compound, composed of a gelable material and a hardener, for which the setting time is considerably longer than the suitable positioning time for the composition, in such a way that this permeates the formation over a significant distance. (b) insertion, after a mechanical or fluid plug, of a rapid-action gelling agent, which causes the instantaneous gelling of that part of the overdelayed gelling compound in the immediate neighborhood of the interface between the zone to be treated and the borehole. Thus preventing displacement of the overdelayed gelling compound toward the interior of the formation. The resultant gelling being both resistant *and* correctly placed.

The invention application is to oil, gas, water or geothermal drillings.

5 Claims, 5 Drawing Sheets

Well bottom temperature: 40°C

*Fig. 4*

Well bottom temperature: 60°C

PROCESS FOR PLUGGING SUBTERRANEAN FORMATIONS

This invention concerns an improved process for the plugging of a permeable subterranean zone or the consolidation of a subterranean formation.

It is well known, especially in the domains of well boring, completion or exploitation of oil wells and drillings for gas, water and geothermal purposes, that permeable subterranean zones are often encountered for which plugging is desirable, either permanently, to avoid fluid loss, or temporarily, for example in order to carry out cementing or stimulate the production of the well.

The nature of permeable formations and the problems posed by them are well known within the profession and will not be repeated here.

At the present time two techniques are used for plugging:

The first which is most used, comprises injecting into the well, at the level of the permeable formation, a gelable material which is usually a mixture of an alkaline solution of a metal silicate and a gelling agent; such as a mineral salt, such as calcium chloride, in solution. The rapid reaction between these two materials forms a gel which seals the porous structure.

The second technique is a process which comprises injecting into the permeable formation a "delayed action" gel, composed of a gelable compound, generally an alkaline metal silicate solution and a slow reactive agent, called the hardener, which is an amino-plastic resin. This mixture, which is initially sufficiently fluid to penetrate into the pores, then transforms under the action of the hardener, with a certain delay which depends on various factors - notably temperature, into a gel which seals the porous formation over a certain distance.

An application of this technique (retarded gelling) is the subject of French patent application No 2 551 451, (HOECHST France), in which a certain number of amino-plastic resins are shown to be usable as adequate hardeners. Information taken from this application and incorporated here is referenced as such.

This second technique presents notable advantages over the first in that plugging is achieved over a greater distance, which makes it more resistant to abrasion, and results in a lower syneresis of the gels, thus obtaining a longer life for the plugging.

The implementation of this process of retarded gelling, in the treatment of oil or other wells, necessitates, nevertheless, particular care on the part of the field engineers, as the setting time of the compound must be regulated with great precision, to correspond exactly to its suitable placement. The hardening time is determined by the time period from the moment that the compound is pumped from the surface to that when it is suitably positioned for efficient plugging of the formation. A shorter setting time would result in gelling within the injection tube, which would have disastrous consequences, whilst a longer setting time would lead to bad plugging of the access to the well, at the permeable formation, because the gel forms at too great a distance from the well, which results in a risk of bad plugging in the proximity of the bore and of dilution of the compound in depth.

In fact it is extremely difficult if not impossible to predict pressure conditions between the hydrostatic (injection) pressure and that of the formation under treatment. It is also very difficult to predict the setting time with sufficient accuracy, this being a function of parameters such as temperature, which are not known with the exactitude necessary at any given moment.

The often difficult conditions of exploitation of oil wells thus never allows operation with the precision necessary. In addition, the phenomenon is aggravated by the presence, within certain formations, of salts which, by going into solution, can influence the setting time.

A process is therefore required with the same advantages, particularly in durability of the plugging gel, as the existing retarded gelling process, but which is more universally and more easily applicable.

It has been discovered that a combination of the two techniques described above overcomes, surprisingly, the uncertainties surrounding the positioning of the compound at the instant of gelling, by allowing a reasonable margin of error on the setting time. The invention presented here is based upon the use of "overdelayed" gelling composition, which means that the composition's setting time is longer than the suitable positioning time, and upon the use of a rapid-action gelling agent (as used in the former of the two previously described techniques), which stops the progression of the composition once a suitable position has been achieved.

The invention concerns then, a new process for plugging and/ or consolidating a permeable geological formation—notably when pierced by a borehole—which is characterised by the following stages:

(a) insertion into the formation of an overdelayed gel, comprising gelable material and a hardener, for which the setting time exceeds the suitable positioning time, in such a way that this composition penetrates the formation over a significant distance from the bore.

(b) injection into bore of a rapid-action gelling agent, suitably selected, to provoke instantaneous gelling, of the overdelayed gel found in the immediate neighbourhood of the interface between the borehole and the zone to be treated. Thus stopping the progression of the overdelayed gel toward the interior of the formation.

Understandably, to avoid gelling taking place within the bore during injection, a suitable means must be used to separate the overdelayed gel from the rapid gelling agent. In general this will be a mechanical plug, water plug, or plug of some other compatible fluid, of appropriate rheology. These are well known to those with experience—polymer solutions for example, such as polysaccharides, preferably biopolymers, xanthan, scleroglucane, biozan, (Azotobacter Indicus) or equivalents. If a mechanical plug is used, the introduction of a very small quantity of cleaning fluid between the two active compounds can be envisaged.

The invention is illustrated in conjunction with the accompanying drawings forming a part of this Specification and in which:

FIG. 1 diagrammatically illustrates laboratory apparatus which can be used to simulate bottomhole conditions end, FIGS. 3–6 graphically illustrate the optimum hardener concentration as a function of pumping time in accordance with the preferred method of the invention, A better understanding of the steps involved in the invented process will be gained from FIG. 1 annexed, which shows:

Figure 1A:
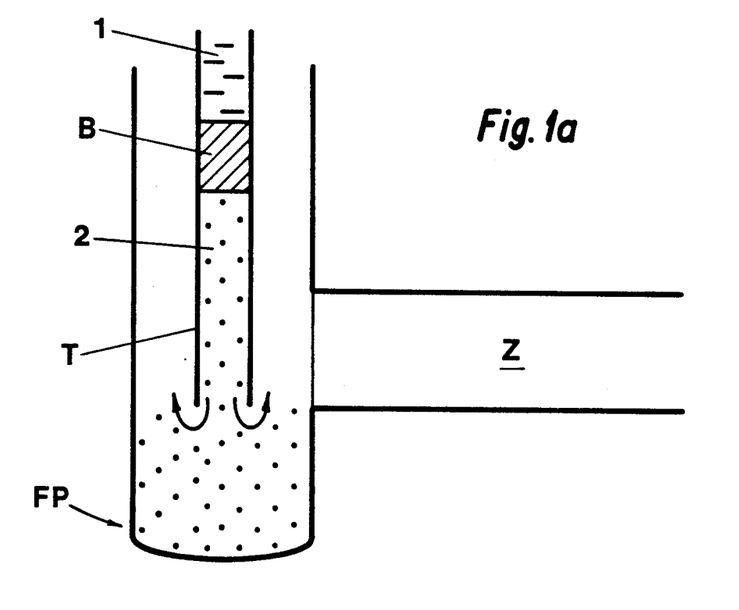
FIGS. 1a through 1d are schematic, sequential views of the wellbore and formation during various steps of the treatment process in accordance with the invention.

FIG. 1a: the overdelayed gel 2 is pumped and following this the plug B, a fluid in this case, and then the gelling agent 1. FP indicates the bottom hole, Z the zone to be treated, T the tubing and N some known cleaning fluid.

Figure 1B:
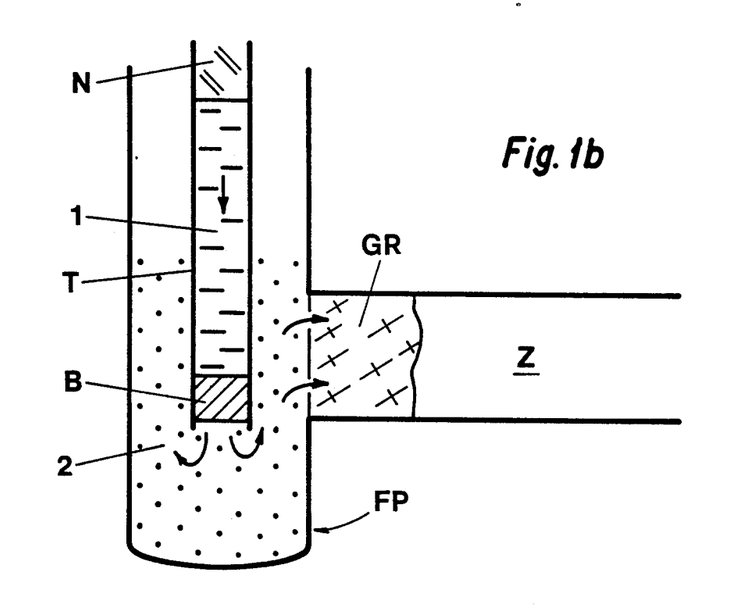

FIG. 1b: compound 2 penetrates zone Z over a considerable distance forming a layer of retarded gel GR within it.

Figure 1C:
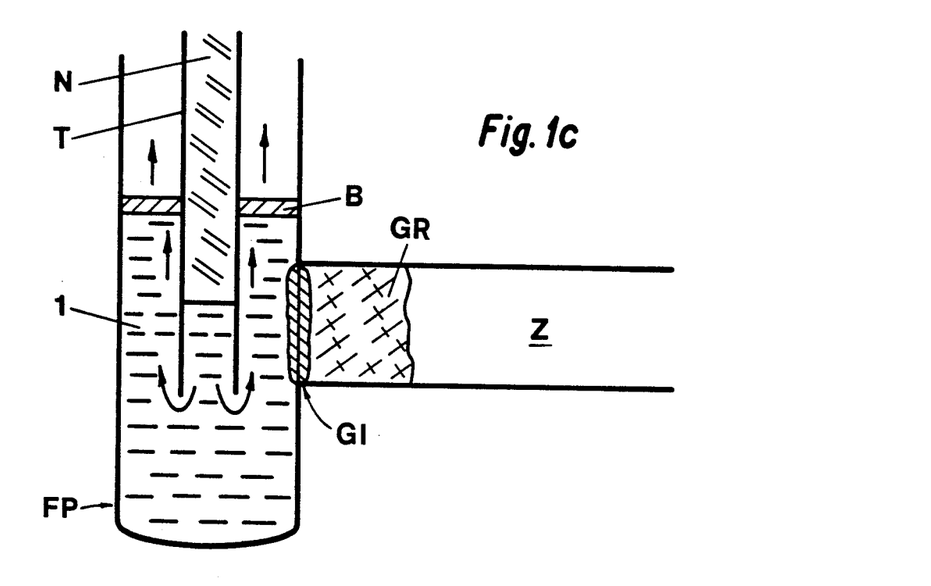

FIG. 1c: the plug B—the overall preference being for a fluid plug - washes briefly the bottom of the well and under the action of the gelling agent, a certain thickness of gel GI is formed instantaneously at the zone/bore interface. The overdelayed gel starts setting behind this interface protector which prevents it (the overdelayed gel) from being displaced further from the well under the effect of pressure.

Figure 1D:
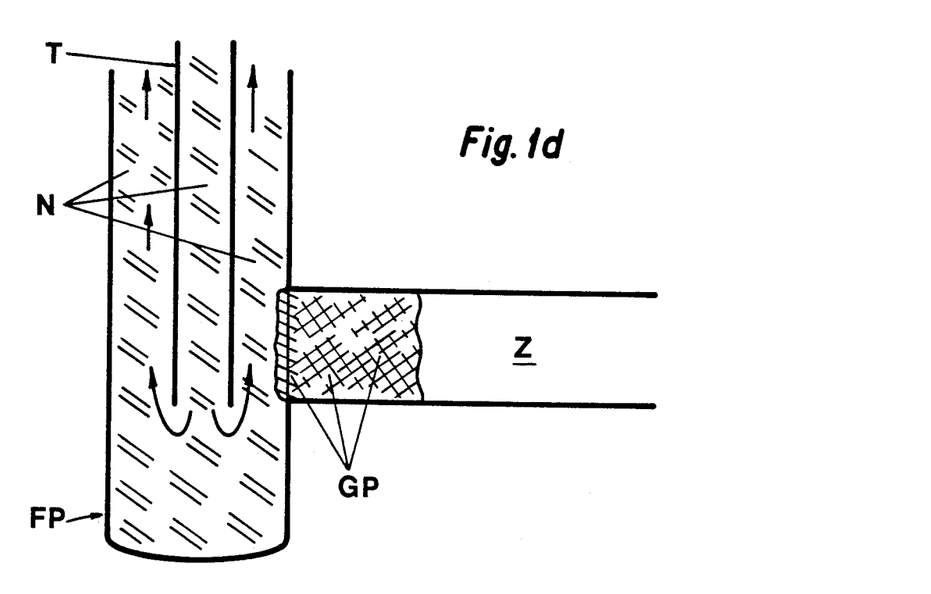

FIG. 1d: the final situation. Once the overdelayed gel has completely set one can be *sure* of the plugging obtained, despite the unavoidable inaccuracy in measures of pressure, temperature, porosity, etc. - - - , that this extends to a notable depth from the well/zone interface, and that it is *resistant*.

The overdelayed gelling composition and the rapid gelling agent are preferably inserted by pumping from the surface, pumping being carried out during a timespan calculated to correspond to the suitable positioning of the compound. The setting time of the overdelayed gel is thus preferably 10% to 15% longer than the pumping time, and in particular cases, longer than the pumping time by 20% to 30%.

It is advantageous for the overdelayed gel to include as its gelable component an alkaline metal silicate, particularly a silicate of sodium, and/or as hardener, at least one water soluble amino-plastic resin, in which the aldehyde is of formaldehyde or glyoxyl or a mixture of the two, and the nitrogenous component is of urea (cf. patent mentioned above).

The rapid-action gelling agent consists preferably of a mineral salt and notably one of divalent cation such as, for example, calcium chloride.

It should be noted that the gel obtained can be redissolved by a solution of soda, NaOH 3N for example. It is thus possible, in certain cementing applications for instance, to plug temporarily one or more productive zones then, later, reactivate their production, with any adaptations which seem necessary to those skilled in the art.

The invented process will be implemented in cases of loss of fluid during drilling or cementing, and for certain operations such as temporary plugging (with subsequent re-solution using soda) of productive zones.

During drilling, all the fluids will be injected in the known way, through the drilling tool, in the following order:
 mud washing fluids (water with possible addition of surfactants to eliminate the salts),
 overdelayed gel solution,
 plug (over approximately 30m/100ft of height) : water or known solutions of polymers such as polysaccharides, biopolymers, guar gum, carob gum etc - - - .

In cementing, the same sequence of operations will be used, injecting the fluids through the casing, but the fluid plug may be replaced by a mechanical plug of the type normally employed for this work.

An example of overdelayed gelling compound (2) for plugging would consist of the following components:
 silicates: from 20% to 25% by volume,
 hardeners (cf. patent cited above) of the amino-plastic resin type: 40 to 130 g/l (0.33 to 1.08 pounds/gal),
 fresh water (containing a maximum of 800 ppm of divalent cations such as $Ca^{2+}$ and 2000 ppm of monovalent cations such as $Na^{+}$.)

This composition allows the setting time to be chosen to be between a half hour and four hours.

In application to consolidation of a formation, the proportion of silicate can be increased to 30% and the proportion of hardener(s) will be approximately 60 to 170 g/l (0.5 to 1.42 pounds/gal) depending on the temperature. Routine tests will allow those with professional experience to choose the concentrations, such that, for the temperature in question, the setting time is obtained in advance. At the higher concentrations of silicate approximately 400 to 800 ppm of $NiCl_2, 6H_2O$ may be added to avoid any syneresis.

FIGS. 3 to 6 of the annex and the table which follows will assist professionals of the field in these tests.

FIGS. 3 to 6 represent the variation of maximum available pumping time as a function of the concentration in hardener(s) (amino-plastic resin(s)) for a mixture consisting of tap water and 20% by volume, at $20°C$ ($68°F$), of sodium silicate, and for temperatures at the bottom of the well of:
 $40°C$ ($104°F$)(FIG. 3)
 $60°C$ ($140°F$)(FIG. 4)
 $80°C$ ($176°F$)(FIG. 5)
 $90°C$ ($194°F$)(FIG. 6)

This maximum time has been determined by measures of viscosity using a FANN 35 viscosimeter—spring 0.2 , speed 6 or 100 rpm in accordance with API standards The following table shows a number of setting times for the gel as a function of the three principal parameters—the percentage volume at $20°C$ ($68°F$) of sodium silicate, the concentration in hardener(s) and the temperature.

TABLE

| % sodium silicate by volume at $20°C.(68°F.)$ | Concentration in hardener(s) | | temperature | | setting time of gel mins. |
| --- | --- | --- | --- | --- | --- |
| | g/l | pounds/gal | deg C. | deg F. | |
| 20 | 130 | 1.08 | 40 | 104 | 60 |
| 20 | 120 | 1.00 | 40 | 104 | 95 |
| 20 | 110 | 0.92 | 40 | 104 | 135 |
| 30 | 154 | 1.28 | 40 | 104 | 110 |
| 20 | 80 | 0.66 | 60 | 140 | 115 |
| 20 | 60 | 0.50 | 70 | 158 | 100 |
| 30 | 90 | 0.75 | 70 | 158 | 95 |

As an example, for a pumping time of 100 minutes and with the temperature of circulation at the bottom of the well (BHCT) at $60°C$ ($140°F$) the overdelayed gel composition has been chosen to be 30% by volume of sodium silicate and 60 g/l (0.5 pounds/gal) of amino-plastic resin. The mixing water is fresh water containing an approximate total of 400 ppm of chlorides of calcium and magnesium, and 820 ppm of sodium chloride.

Figure 2:
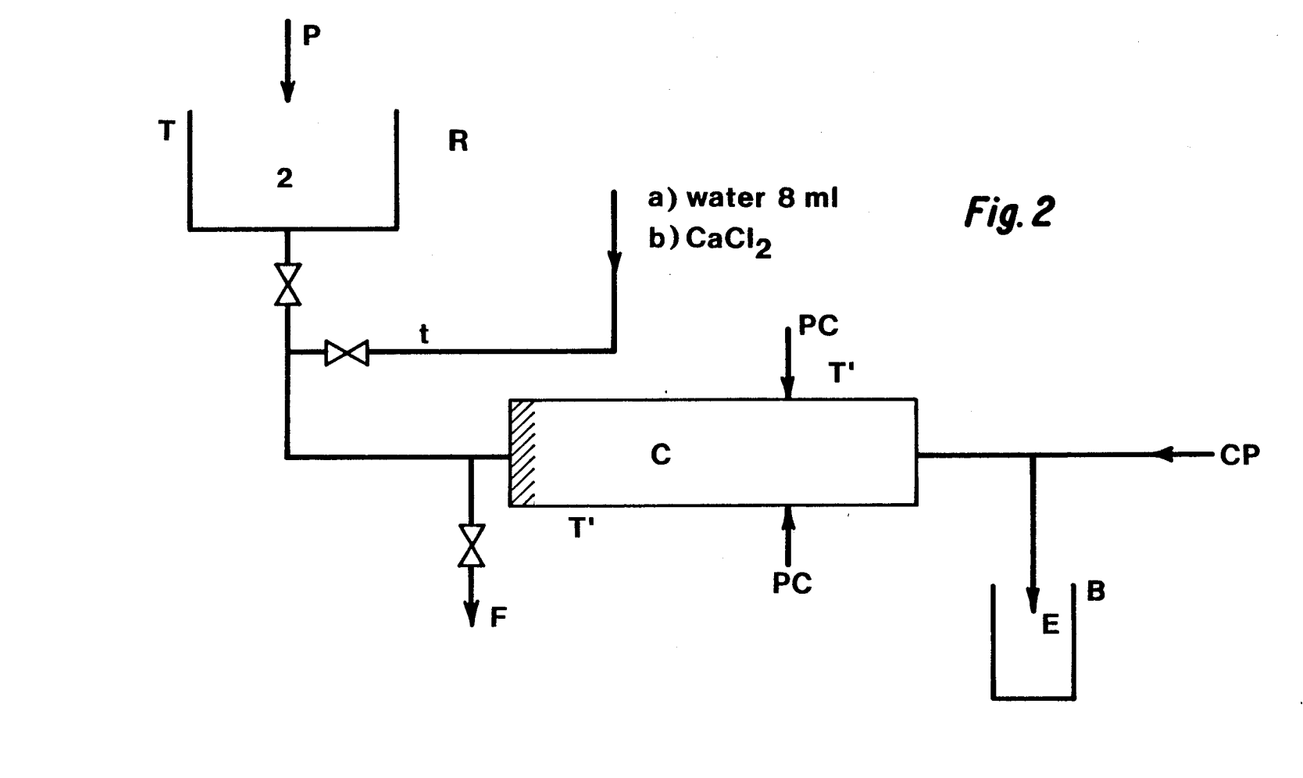
Figure 3:
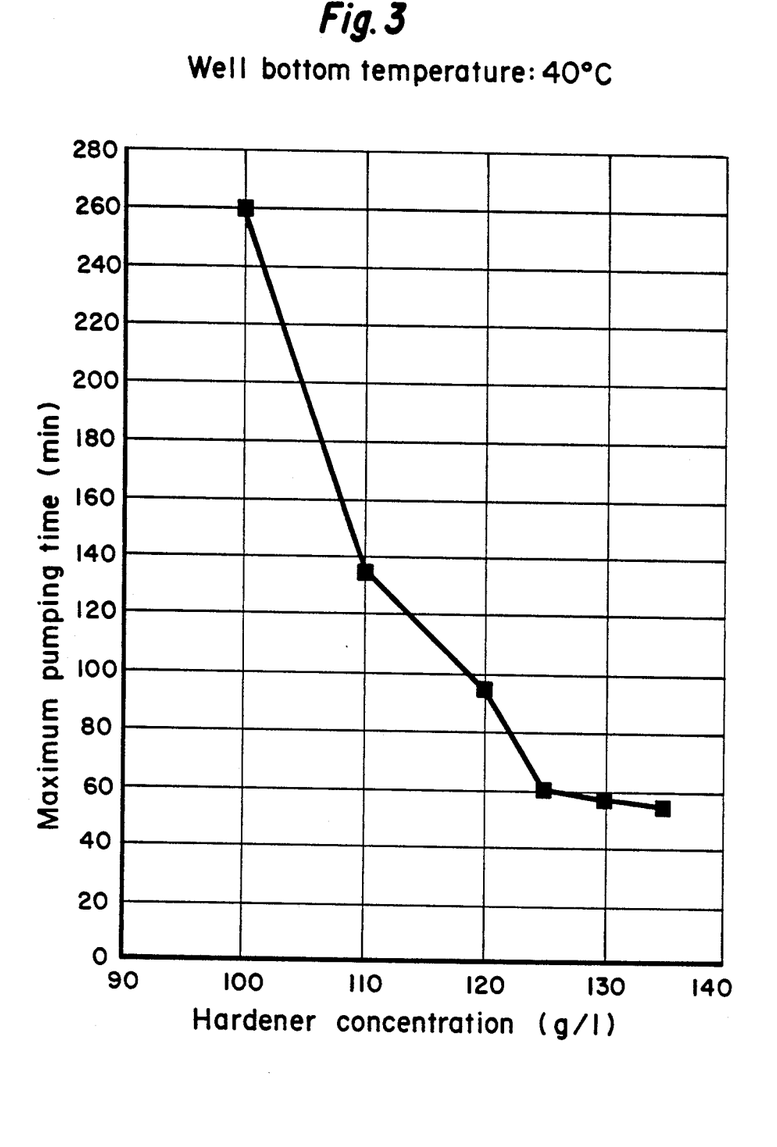
Figure 4:
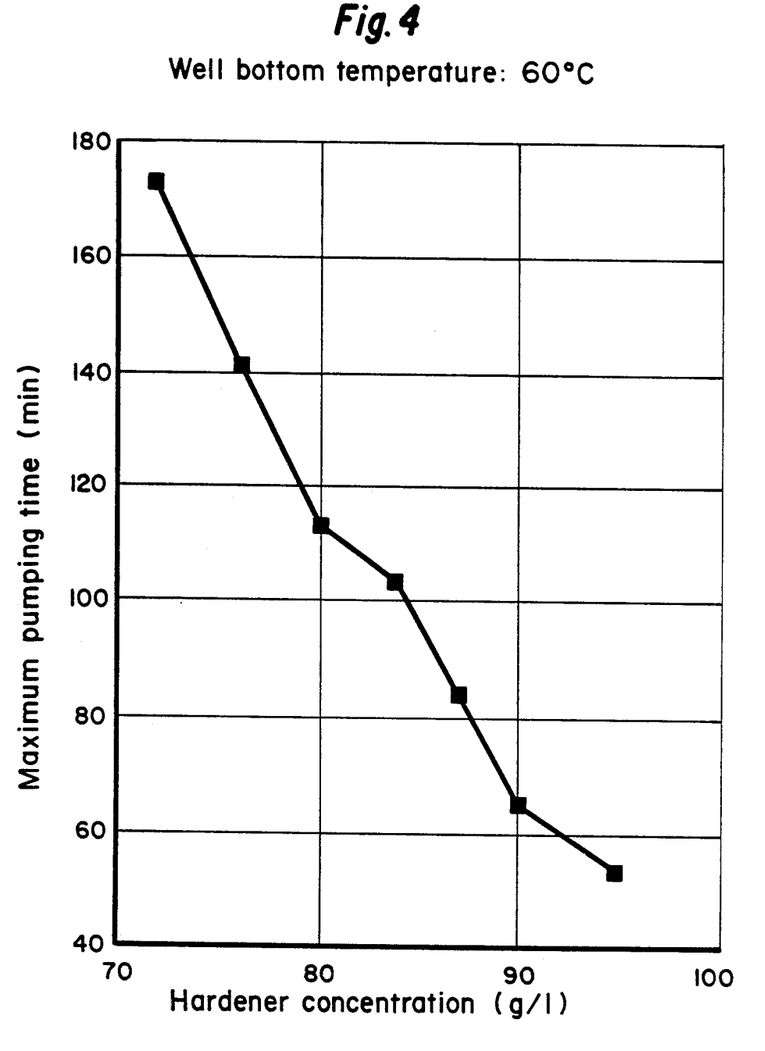

The conditions at the hole bottom have been simulated using the laboratory apparatus shown diagramatically in FIG. 2.

The solution of overdelayed gel described above is prepared in the receptacle R, which can be pressurised at pressure P, and heated to the desired temperature T. This gel solution is then piped into the core sample C (which consists of sandstone, carbonate, or synthetic porous material), the permeability of which is between 100 mD and 3D (100 milliDarcy and 3 Darcy).

A containment pressure PC and a counter pressure CP are applied to simulate the conditions at well bottoms. When solution 2 has entirely penetrated the core sample, 8 ml of water is inserted through the lateral tube (t), immediately followed by, the gelling agent (calcium chloride). The 8 ml of water (plug) is for the purpose of avoiding precipitation in the pipes, and is recovered at F.

As will be observed, the eluate E is recovered in tank B.

A series of tests is carried out, using different core samples and varying the pressure P (between 2 and 20 bars) and the temperature T'(between 40, 60 and 80$^{deg}$C(104,140 and 176$^{deg}$F). PC and CP are fixed at 75 bars and 10 bars respectively.

In all the tests carried out, the flow ceases totally once the calcium chloride reaches the core sample, which shows that this agent instantaneously causes the formation of a sealing layer in the region of the inlet surface to the core sample (shown as the shaded area of the FIG. 2).

Using a preferred variant of the invention, an application has been found which resolves the problem of complete loss of fluid during drilling.

This problem appears, not in the presence of pores or channels of small dimensions, but where larger fractures or voids exist.

In this situation, the product used to treat the formation is lost horizontally, and there is no possibility of sealing, over an adequate height, the formation responsible for the loss.

According to the variant of the invention applicable to this case, small quantities of biopolymers capable of resisting acid or alkaline pH, high temperatures and shearing stresses, can be added to the treating fluid to increase its viscosity. The filling effect of the fluid can be further improved by the incorporation of materials known for their effect on fluid loss ("lost circulation materials"), such as nut or apricot shells, kolite, gilsonite or fragments of shredded cellophane. The field of application of the invention is thus extended to karstic and "vugular" (vuggy) formations.

Up to the present time the only known solution for problems of complete horizontal loss was an expedient consisting in sealing the formation by successive stages of 50 cm to 1 m in height. Not only is this method very uneconomical, it is not even always reliable—when there is a considerable height of formation to be treated.

The invention, by modifying the rheology and possibly loading the fluid with bridging agents enables, according to the prescribed variant, considerable heights of formations to be sealed, even in the case of total loss. This represents an obvious advantage.

Examples (non limitative) of usable biopolymers would include the gum xanthane, scleroglucane, and the polymer obtained by bacterial fermentation of *Azotobacter Indicus* (notably KELCO "BIOZAN").

A suitable increase in viscosity of the aqueous amino-plastic resin/sodium silicate solution can be obtained using a concentration of approximately 2 to 10 grammes of biopolymers per liter of fresh (approx. 0.016 to 0.083 pounds/gal.). In cases where lost circulation materials are added, the proportion of the viscosity increasing agent may be reduced.

The required quantity of viscosity increasing agent will be determined using the fluid mechanics equations well known to professionals in this field.

EXAMPLE A:

| Basic formulation. | % by volume | | |
|---|---|---|---|
| Silicate of sodium ($SiO_2/Na_2O = 3$) | 20% | | |
| Amino-plastic resin | 10% | | |
| Fresh water | 70% | | |
| "BIOZAN" | | | |
| Temperature = 40 deg C. (104 deg F.) | | | |
| x-g/l of water | 0 | 2.5 | 4.0 | 8.0 |
| (pounds/gal) | (0) | (0.020) | (0.033) | (0.066) |
| PV- | 1 | 5.5 | 9.0 | 15.1 |
| TY-pounds f/100 sq ft | 0 | 3.4 | 6.5 | 16.2 |
| (Pa) | (0) | (1.6) | (3.1) | (7.8) |
| GT-minutes | 105 | 95 | 73 | 55 |

Where,
x = proportion of BIOZAN
PV = plastic viscosity cP
TY = dynamic viscosity (Pa)
GT = gelling time The gelling time is determined using a Brookfield LVTD viscometer, pointer 1, at constant speed (between 6 and 60 rpm).

A rapid increase in viscosity, corresponding to decreasing GT, will be observed.

In this test the temperature is thermostatically controlled to within ± 1degC using a recirculation bath.

The rheological characteristics are determined by agitation, at the test temperature, for 20 minutes in an atmospheric consistometer, in accordance with API specification 10 for cement slurries.

Example B

Same basic formulation as example A.

| Temperature = 80 deg C. (176 deg F.) | | | | |
|---|---|---|---|---|
| x-g/l of water | 0 | 2.5 | 4.0 | 8.0 |
| (pounds/gal) | (0) | (0.020) | (0.033) | (0.066) |
| PV- | 1 | 5.5 | 9.0 | 15.1 |
| TY-pounds f/100 sq ft | 0 | 3.4 | 6.5 | 16.2 |
| (Pa) | (0) | (1.6) | (3.1) | (7.8) |
| GT-minutes | 105 | 95 | 73 | 55 |

Where,
x = BIOZAN
PV = plastic viscosity cP
TY = dynamic viscosity (Pa)
GT = gelling time The gelling time is determined using a Brookfield LVTD viscometer, pointer 1, at constant speed (between 6 and 60 rpm).

We claim:

1. Process to plug and/or consolidate a permeable geological formation traversed by a borehole, comprising:
   (a) injecting into the formation an overdelayed gelling composition comprising a gelable component and at least one hardener, said hardener being a water soluble amino-plastic resin in which an aldehyde component is selected from formaldehyde, glyoxal and mixtures thereof and a nitrogenous component comprising urea, and having a setting time considerably longer than a required pumping time, whereby the gelling compound permeates the formation over a significant distance from the borehole injecting into the borehole, following a mechanical or fluid plug, a rapid-action gelling agent, chosen such that it provokes instantaneous gelling of that part of the overdelayed gelling compound adjacent an interface between the borehole and the formation to be treated thereby preventing the overdelayed gelling compound from being displaced a substantial distance from the borehole.

2. Process, according to claim 1 characterized in that the composition of the overdelayed gelling compound includes as its gelable component an alkaline metal silicate and about 400 to 800 ppm of $NiCl_2:6H_2O$.

3. Process according to claim 1 characterized in that the rapid-action gelling agent is a mineral salt.

4. Process according to claim 3 characterized in that the gelling agent is a mineral salt of divalent cation.

5. Process according to claim 4 characterized by he fact that the gelling agent is calcium chloride.

* * * * *

UNITED STATES PATENT AND TRADEMARK OFFICE
CERTIFICATE OF CORRECTION

PATENT NO. : 4,838,352
DATED : June 13, 1989
INVENTOR(S) : Rudiger Oberste-Padtberg, Philippe Parcevaux and Herve Perthuis It is certified that error appears in the above-identified patent and that said Letters Patent is hereby corrected as shown below:

Title page:

Inventors: Please change the inventor line to read --Rudiger Oberste-Padtberg, Philippe Parcevaux and Herve Perthuis--

Signed and Sealed this

Second Day of April, 1991

Attest:

HARRY F. MANBECK, JR.

Attesting Officer

Commissioner of Patents and Trademarks